United States Patent
Sato et al.

(10) Patent No.: US 10,731,232 B2
(45) Date of Patent: Aug. 4, 2020

(54) METHOD FOR LEACHING COPPER FROM COPPER SULFIDE ORE

(71) Applicant: JX NIPPON MINING & METALS CORPORATION, Tokyo (JP)

(72) Inventors: Katsuyuki Sato, Tokyo (JP); Akira Miura, Hitachi (JP)

(73) Assignee: JX NIPPON MINING & METALS CORPORATION, Tokyo (JP)

(*) Notice: Subject to any disclaimer, the term of this patent is extended or adjusted under 35 U.S.C. 154(b) by 289 days.

(21) Appl. No.: 15/737,513

(22) PCT Filed: Sep. 12, 2016

(86) PCT No.: PCT/JP2016/077607
§ 371 (c)(1),
(2) Date: Dec. 18, 2017

(87) PCT Pub. No.: WO2017/043668
PCT Pub. Date: Mar. 16, 2017

(65) Prior Publication Data
US 2018/0187287 A1 Jul. 5, 2018

(30) Foreign Application Priority Data
Sep. 11, 2015 (JP) ................. 2015-180073

(51) Int. Cl.
*C22B 15/00* (2006.01)
*C22B 3/44* (2006.01)

(52) U.S. Cl.
CPC ............ *C22B 15/0071* (2013.01); *C22B 3/44* (2013.01); *Y02P 10/234* (2015.11); *Y02P 10/236* (2015.11)

(58) Field of Classification Search
CPC ..... C22B 15/0071; C22B 3/44; Y02P 10/234; Y02P 10/236
See application file for complete search history.

(56) References Cited

U.S. PATENT DOCUMENTS

| | | |
|---|---|---|
| 2010/0018349 A1 | 1/2010 | Manabe |
| 2011/0041654 A1 | 2/2011 | Manabe |
| 2011/0229385 A1 | 9/2011 | Kuwano et al. |
| 2012/0222519 A1* | 9/2012 | Hatano ............... C22B 3/06 75/744 |
| 2012/0237995 A1 | 9/2012 | Kuwano et al. |

FOREIGN PATENT DOCUMENTS

| | | | |
|---|---|---|---|
| CN | 109351768 A | * | 2/2019 |
| JP | 4565025 B2 | | 10/2010 |
| JP | 4950257 B2 | | 10/2010 |
| JP | 5296126 B2 | | 9/2013 |
| JP | 5571416 B2 | | 9/2013 |
| RU | 2336341 C1 | * | 10/2008 |

OTHER PUBLICATIONS

International Preliminary Report on Patentability and the Written Opinion of the International Searching Authority (Forms PCT/IB/326, PCT/IB/373 and PCT/ISA/237), dated Mar. 22, 2018, for International Application No. PCT/JP2016/077607.
International Search Report (PCT/ISA/210) issued in PCT/JP2016/077607, dated Dec. 9, 2016.
Written Opinion (PCT/ISA/237) issued in PCT/JP2016/077607, dated Dec. 9, 2016.

* cited by examiner

*Primary Examiner* — Jenny R Wu
(74) *Attorney, Agent, or Firm* — Birch, Stewart, Kolasch & Birch, LLP

(57) ABSTRACT

The present invention provides a method for efficiently leaching copper from copper sulfide ore by separating and recovering iodine, and iron(III) ions to be used are regenerated by a heap of stacked ore in the method for leaching copper from copper sulfide using a sulfuric acid solution containing iodide ions and iron(III) ions as a leaching solution. The present invention relates to a method for leaching copper from copper sulfide, comprising the following steps: a copper leaching step for leaching copper from copper sulfide ore using a sulfuric acid solution containing iodide ions and iron(III) ions as a leaching solution to yield a first solution; an iodine separation treatment step for separating iodine in the first solution to yield a second solution having a lowered concentration of iodine therein; and an iron oxidation step for oxidizing the second solution to yield a third solution, leaching the copper sulfide ore or another copper sulfide using the third solution and an aqueous solution containing iodine, wherein the iron oxidation step comprises irrigating the solution after iodine separation treatment onto stacked ore, thereby oxidizing iron(II) ions existing in the solution after iodine treatment and generated by copper leaching.

20 Claims, 4 Drawing Sheets

[Fig 1]
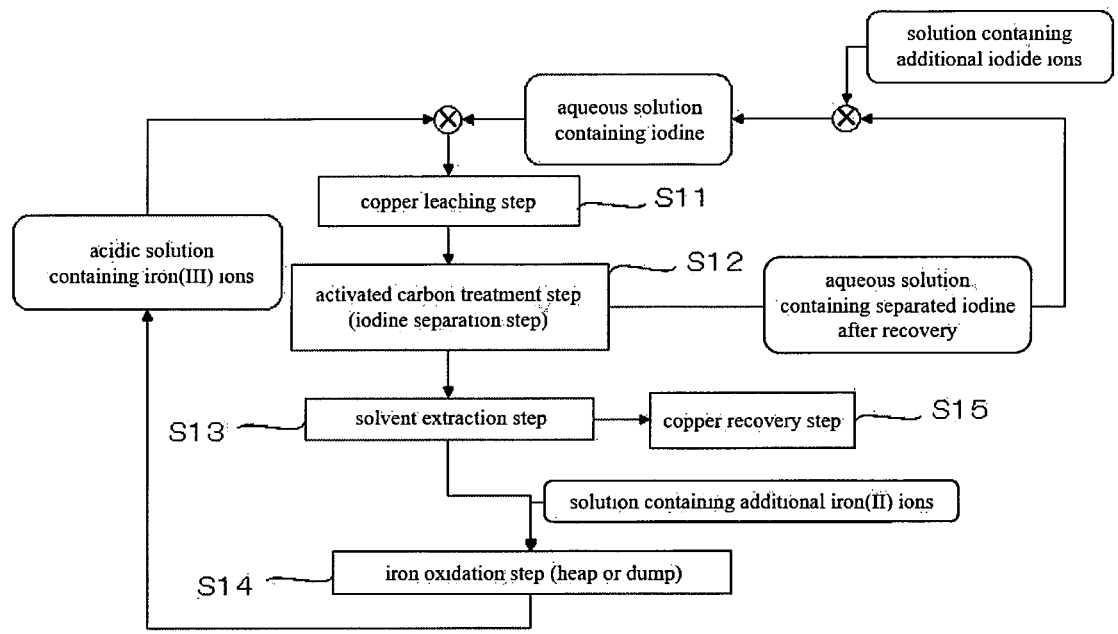
[Fig 2]
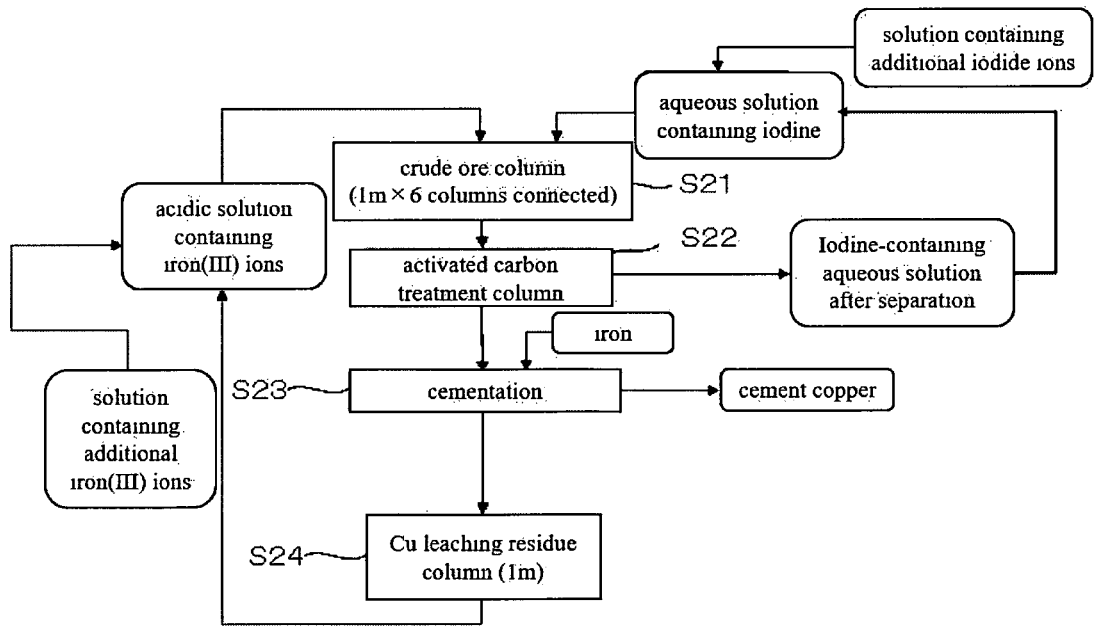

[Fig 3]
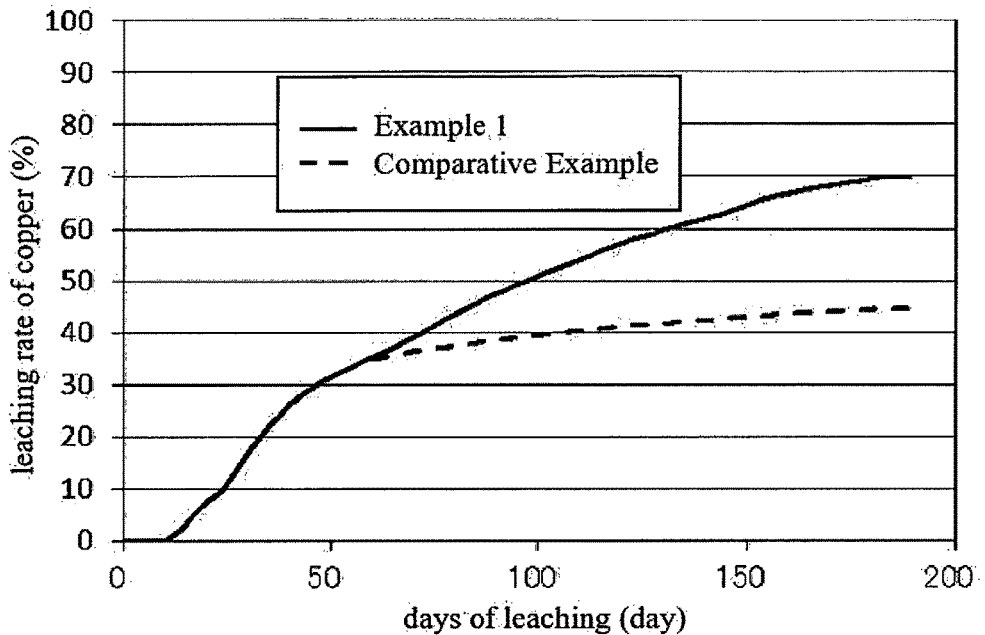
[Fig 4]
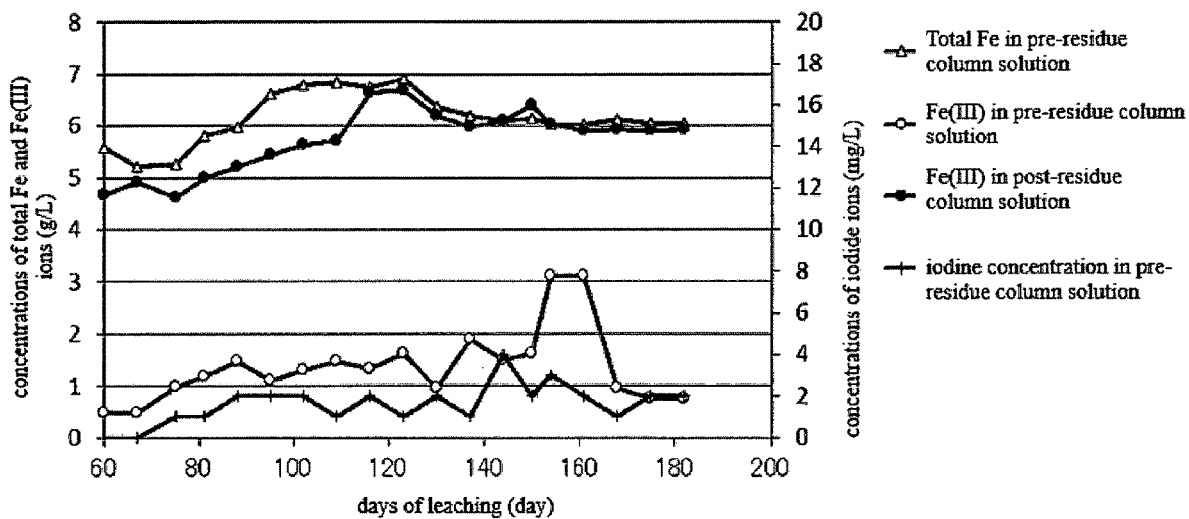

[Fig 5]
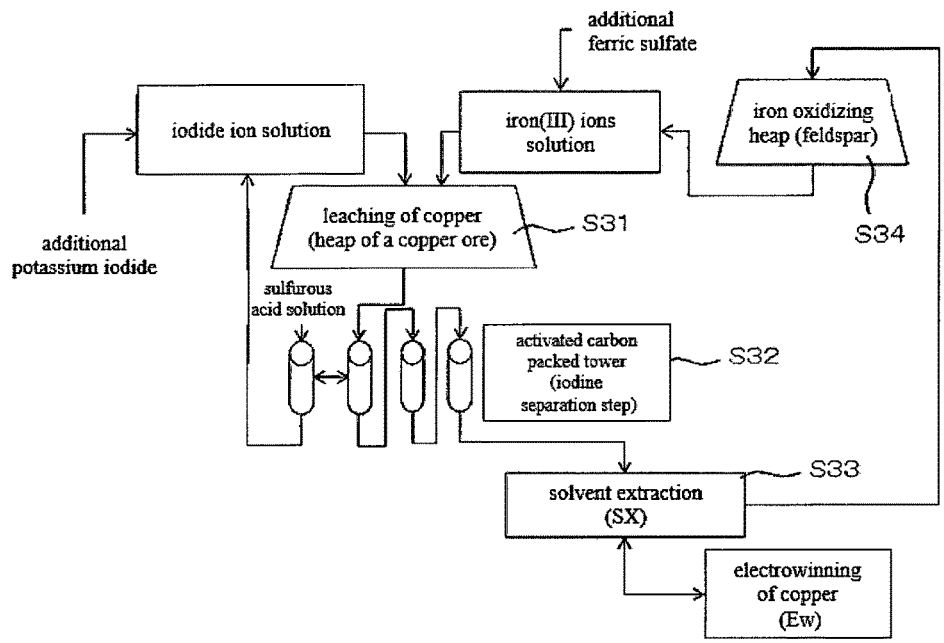
[Fig 6]
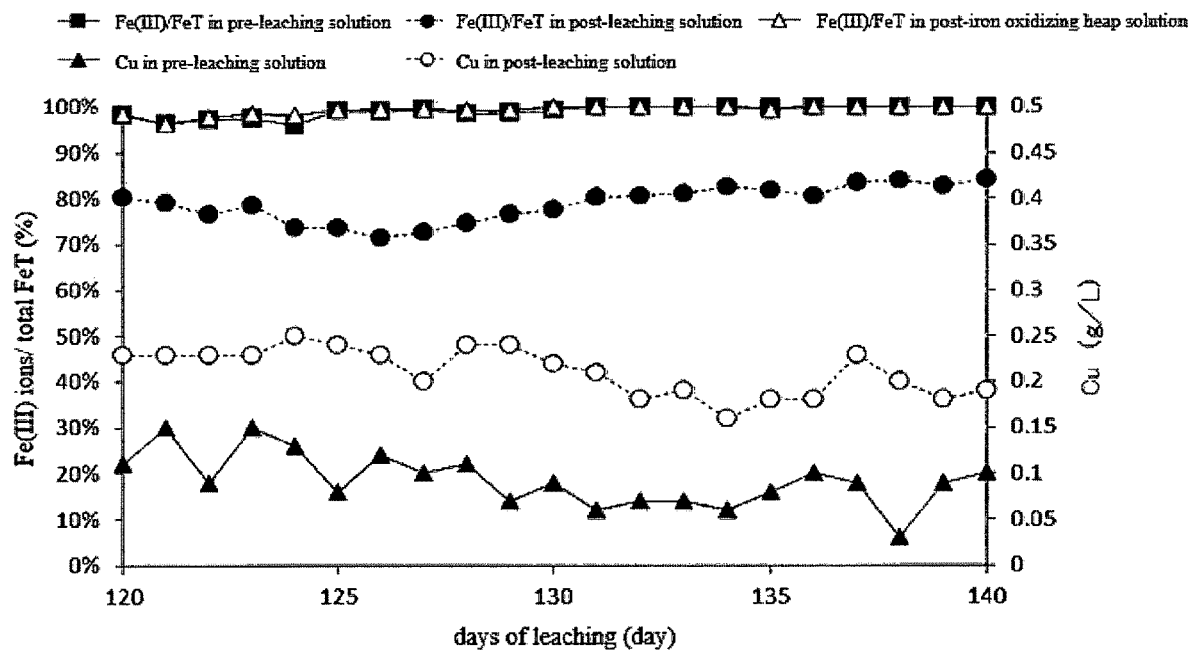

[Fig 7]
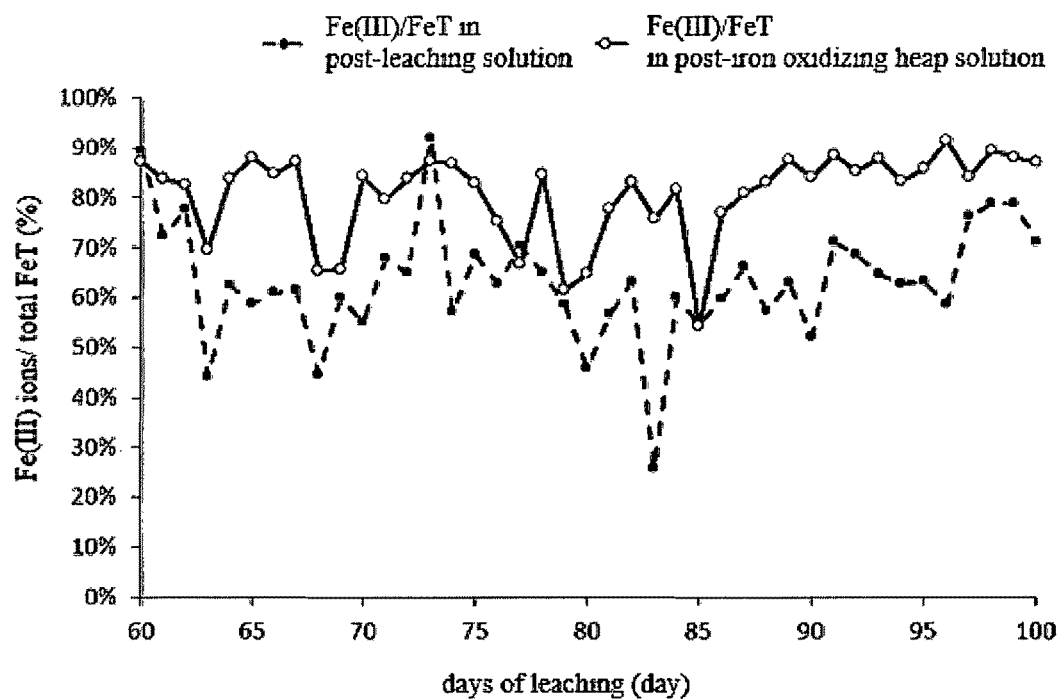
[Fig 8]
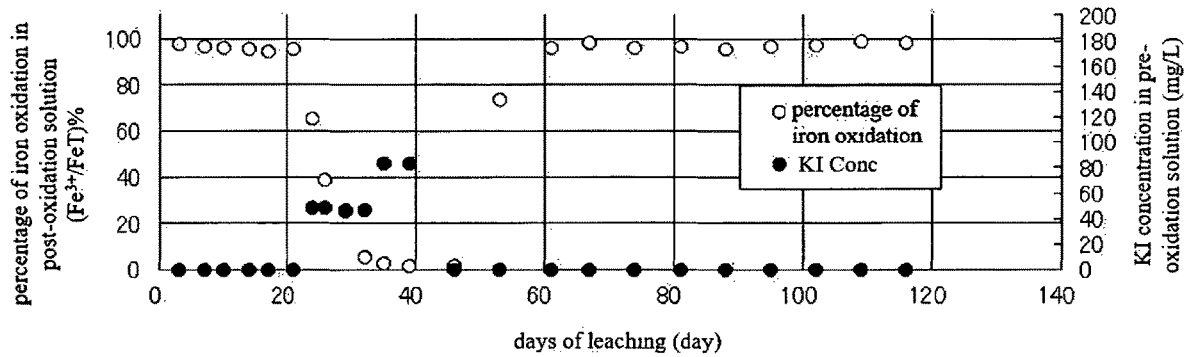

METHOD FOR LEACHING COPPER FROM COPPER SULFIDE ORE

TECHNICAL FIELD

The present invention relates generally to a method for leaching copper from copper sulfide ore by using a sulfuric acid solution as a leaching solution, wherein the sulfuric acid solution contains iodide ions and iron(III) ions, preferably, an excess amount of iron (III) ions relative to the iodide ions. More specifically, the present invention relates to a method for leaching copper from copper sulfide ore, wherein the leaching solution is regenerated by the following steps:
leaching copper from a copper sulfide ore using a sulfuric acid solution containing iodide ions and iron(III) ions as a leaching solution to yield a first solution;
separating iodine from the first solution to yield a second solution having a lowered concentration of iodine therein;
oxidizing the second solution to yield a third solution; and then
further adding an aqueous solution containing iodine to the third solution to yield a regenerated leaching solution.

BACKGROUND ART

In general, various forms of leaching copper sulfide ore by hydrometallurgy are known, such as forms of:
1) leaching copper with sulfuric acid or hydrochloric acid via a batch-wise stirring reaction; and
2) forming a stack of ores and supplying sulfuric acid or hydrochloric acid from the top of heaped ores and collecting liquid droplets dropped by the force of gravity (commonly referred to as heap leaching).

Besides, a method is also known in which force of bacteria, for example, iron-oxidizing microorganisms is utilized to leach and recover copper more efficiently (commonly referred to as bioleaching).

Bioleaching, one approach of hydrometallurgy for copper sulfide ore, has been put in practice to recover copper from secondary copper sulfide ore, such as chalcocite and covellite. However, if bioleaching is normally conducted at ambient temperature, bioleaching has a problem of a significantly low leaching rate due to extremely low solubility of primary copper sulfide ore such as chalcopyrite in inorganic acid.

To solve this problem, examples are reported in Japanese Patent No. 4565025 (hereafter referred to as PTL 1) and Japanese Patent No. 4950257 (hereafter referred to as PTL 2) in which leaching of copper from a copper sulfide ore containing primarily chalcopyrite or enargite is facilitated at ambient temperature under co-existence of iodide ion and iron(III) ions, wherein iron(III) ions are an oxidant. On the above occasion, with regard to iron(III) ions to be used as the oxidant, if iron(II) ions resulted from the leaching reaction can be oxidized to iron(III) ions and supplied again, such a case is economically desirable. Further, it is economically and environmentally desirable that a post-leaching solution preferably is also recycled as the immersion solution without being disposed of.

There are various methods to oxidize iron(II) ions to iron(III) ions, but it is preferable that a method of using iron-oxidizing microorganisms which can be applied under milder conditions, and are excellent in terms of cost. However, iodine contained in the post-leaching solution has high bactericidal properties to the iron-oxidizing microorganisms, thus tending to make it more difficult to regenerate iron (III) ions from the post-leaching solution containing iodine by using iron oxidizing microorganisms.

Accordingly, Japanese Patent No. 5571416 (hereafter referred to as PTL 3) has proposed a method for leaching copper from copper sulfide ore, wherein, upon leaching copper from copper sulfide ore using a sulfuric acid solution containing iodide ions, along with an excess amount of iron(III) ions relative to the iodide ions is used as a leaching solution, the solution obtained after the copper leaching process is treated with activated carbon to lower the concentration of iodine therein to a level less than 1 mg/L, and then iron(II) ions in the solution after copper is recovered are oxidized to iron(III) ions by the iron-oxidizing microorganisms, and then mixed with an aqueous solution containing the post-iron oxidizing solution and iodine, and used as the leaching solution for copper sulfide ore. However, such a method has had problems in which, for example, as described in Japanese Patent No. 5296126 (hereafter referred to as PTL 4), particular culture apparatus is necessary for propagation of iron-oxidizing microorganisms, and in order to avoid an influence on growth of the iron-oxidizing microorganisms, a concentration of iodine which is bactericidal needs to be lowered to a level less than 1 mg/L.

CITATION LIST

Patent Literature

[PTL 1] Japanese Patent No. 4565025
[PTL 2] Japanese Patent No. 4950257
[PTL 3] Japanese Patent No. 5571416
[PTL 4] Japanese Patent No. 5296126

SUMMARY OF INVENTION

Technical Problem

As mentioned above, in order to efficiently leach copper from copper sulfide ore by using iodide ions, it is desirable to recycle iodide ions and iron(III) ions. However, such a method has had problems in which, in an iron oxidation step, particular apparatus is necessary for propagation of iron-oxidizing microorganisms, and in order to avoid an influence on growth of particular iron-oxidizing microorganisms, a concentration of iodine which is bactericidal needs to be lowered to a level less than 1 mg/L.

In view of the above-mentioned problems, an object of the present invention is to provide a method for leaching copper from copper sulfide ore employing iodide ions, while iron (III) ions are regenerated efficiently and simply under versatile conditions at an actual operation level in leaching using iodide ions.

Solution to Problem

After intensively studying to address the above-mentioned problems, the present inventors have found that, upon regenerating iron(III) ions in iodine leaching of copper from copper sulfide ore containing primarily chalcopyrite or enargite, iodine is recovered by using activated carbon, and then apart from a copper leaching step in which copper ore are stacked, the resultant solution is passed through stacked ore, such as a heap or a dump, to enable production of iron(III) ions. The present invention is achieved based on such findings.

Specifically, the present invention covers the following subject matters:

(1). A method for leaching copper from copper sulfide ore, comprising the following steps:
a copper leaching step for leaching copper from a copper sulfide ore using a sulfuric acid solution containing iodide ions and iron(III) ions as a leaching solution to yield a first solution;
an iodine separation treating step for separating iodine in the first solution to yield a second solution having a lowered concentration of iodine therein;
an iron oxidation step for oxidizing the second solution to yield a third solution; and leaching the copper sulfide ore or another copper sulfide ore using the third solution and an aqueous solution containing iodine,
wherein the iron oxidation step comprises irrigating the second solution onto a stacked ore, thereby oxidizing ion(II) ions generated via the copper leaching step.

(2). The method for leaching copper from copper sulfide ore according to (1), further comprising newly adding ion(II) ions to the second solution before the iron oxidation step.

(3). The method for leaching copper from copper sulfide ore according to (1) or (2), wherein the stacked ore onto which the second solution is irrigated is formed by stacking leaching residue of a copper ore.

(4). The method for leaching copper from copper sulfide ore according to (1) or (2), wherein the primary component of the stacked ore onto which the second solution is irrigated is silicate ore.

(5). The method for leaching copper from copper sulfide ore according to any one of (1) to (4), wherein an 80% passing particle size of ore used for the stacked ore onto which the second solution is irrigated is 1 centimeter or more.

(6). The method for leaching copper from copper sulfide ore according to any one of (1) to (5), wherein no microorganisms are added preliminarily or during the iron oxidation step, to the stacked ore onto which the second solution is irrigated.

(7). The method for leaching copper from copper sulfide ore according to any one of (1) to (6), wherein a ratio (a) of a volume of the stacked ore to the 80% passing particle size of the stacked ore onto which the second solution is irrigated and a ratio (b) of a volume of the copper sulfide ore used in the copper leaching step to a 80% passing particle size of the copper sulfide ore used in the copper leaching step satisfy an expression: a/b≥0.1.

Advantageous Effects of Invention

The present invention exhibits significant advancements over prior art. For example, (1). Copper can be efficiently leached from copper sulfide ore containing chalcopyrite and enargite at ambient temperature.

(2). The present invention forms a reaction system in which, in the method for leaching copper using a sulfuric acid solution containing iodide ions and iron(III) ions in the leaching solution, iron(III) ions being an oxidant needed for oxidizing iodine for copper leaching is produced without using particular culture apparatus as described in PTL 3 and 4, and irrigated along with the solution containing iodine separately, or irrigated after being mixed with the solution containing iodine onto a copper sulfide ore. Therefore, iodine ($I_2$) and/or triiodide ions ($I_3^-$) serving as a catalyst in a reaction of dissolving copper sulfide ore in the copper leaching step is regenerated and supplied all the time.

(3) Use of any particular substance is unnecessary for oxidation of iron, by using a residue after leaching copper or an ore containing primarily general feldspar in the iron oxidation step. Therefore, iron(III) ions may be produced cost-effectively and simply.

(4) If the concentration of iodine in the second solution is lowered to about 10 mg/L, such a level is sufficient, and strict concentration control is not required as it has been conventionally.

BRIEF DESCRIPTION OF DRAWINGS

FIG. 1 illustrates a treatment flow when activated carbon and a stacked ore heap (or dump) are used according to one general embodiment of the present invention.

FIG. 2 illustrates a flow in Example 1.

FIG. 3 illustrates change of a leaching rate of copper in Example 1 and Comparative Example respectively.

FIG. 4 illustrates change of a concentration of total iron ions and total iodine in the pre-residue column solution, and change of a concentration of iron(III) ions in the pre-residue column solution and the post-residue column solution in Example 1.

FIG. 5 illustrates a flow in Example 2.

FIG. 6 illustrates a proportion of iron(III) ions in total iron and a concentration of copper ions in the pre-leaching solution and the post-leaching solution, and moreover, a proportion of iron(III) ions in total iron in the post-iron oxidation heap solution in Example 2.

FIG. 7 illustrates a proportion of iron(III) ions in total iron in the post-leaching solution and moreover, a proportion of iron(III) ions in total iron in the post-iron oxidation heap solution in Comparative Example.

FIG. 8 is a graph that illustrates a relationship between a concentration of iodide ions and a percentage of iron oxidation in an iron oxidation treatment step.

DESCRIPTION OF EMBODIMENTS

In accordance with the present invention, a method for leaching copper from copper sulfide ore, comprising the following steps:
a copper leaching step for leaching copper from a copper sulfide ore using a sulfuric acid solution containing iodide ions and iron(III) ions as a leaching solution to yield a first solution;
an iodine separation treating step for separating iodine in the first solution to yield a second solution having a lowered concentration of iodine therein;
an iron oxidation step for oxidizing the second solution to yield a third solution; and leaching the copper sulfide ore or another copper sulfide ore using the third solution and an aqueous solution containing iodine,
wherein the iron oxidation step comprises irrigating the second solution onto a stacked ore, thereby oxidizing ion(II) ions generated via the copper leaching step.

The copper sulfide ore containing chalcopyrite or enargite being a target ore according to the present invention preferably may be copper sulfide ore containing primarily or partially chalcopyrite or enargite. However, it should be appreciated that a content thereof is not particularly limited, but the ore is preferably copper sulfide ore containing primarily chalcopyrite or enargite in view of sufficiently obtaining a copper leaching effect according to the present invention.

In accordance with the present invention, hydrometallurgy of copper employing the sulfuric acid solution as the leaching solution may be applied to the present invention in any leaching form. For example, the form may be batch-wise stirring leaching, and also any of heap leaching or dump leaching in which sulfuric acid is irrigated onto stacked ore to leach copper therein.

The copper leaching step may be conducted at ambient temperature without particularly required heating. However, it should be appreciated that the present invention is not limited to any certain temperature condition.

In accordance with the present invention, dissolution of the copper sulfide ore and leaching copper therefrom is considered to progress according to a series of the following catalytic reactions by iodine.

$$2I^- + 2Fe^{3+} \rightarrow I_2 + 2Fe^{2+} \quad \text{(Formula 1)}$$

$$CuFeS_2 + I_2 + 2Fe^{3+} \rightarrow Cu^{2+} + 3Fe^{2+} + 2S + 2I^- \quad \text{(Formula 2)}$$

After both sides of the above Formulae 1 and 2 are summed, eliminating the iodine component, Formula 3 is established and shows a conventionally suggested leaching reaction for the copper sulfide ore using iron (III) ions as an oxidant.

$$CuFeS_2 + 4Fe^{3+} \rightarrow Cu^{2+} + 5Fe^{2+} + 2S \quad \text{(Formula 3)}$$

As illustrated in Formula 2, leaching of copper from the copper sulfide ore is achieved by a reaction using iodine ($I_2$) as a catalyst. However, iodine has a poor solubility in water. Therefore, iodide, which can be easily dissolved into the leaching solution and dissociated into iodide ions ($I^-$), is added to the leaching solution. The iodide may be any component that is soluble in water to yield iodide ions ($I^-$). For example, sodium iodide, potassium iodide, ammonium iodide, and hydrogen iodide are applicable to the present invention. Besides, iodine recovered from the post-leaching solution by an anion exchange resin, or by exposure after oxidation in the presence of an oxidant (i.e. blowout), or by solvent extraction may be re-used in a state of the solution containing iodine in the form of the aforementioned various iodine, or in the form of other iodine component.

Initially, in the reaction according to Formula 1, the iodide ions ($I^-$) which are added to the leaching solution are oxidized by the iron (III) ions ($Fe^{3+}$) to produce iodine ($I_2$). Then, the elementary iodine ($I_2$) produced by the reaction of Formula 1 reacts with the remaining iodide ions ($I^-$), and thereby triiodide ions ($I_3^-$) are also produced in the leaching solution. A total concentration of iodine in the leaching solution may be appropriately determined according to a reaction form and a type, a shape, or a copper grade and so on of the target copper sulfide ore. For example, the total concentration of iodine preferably is between 100 mg/L and 300 mg/L as suggested in Japanese Patent No. 4565025, or between 8 mg/L and 100 mg/L as suggested in Japanese Patent No. 4950257.

As indicated in the above Formula 3, the iron (III) ions as an oxidant need to be supplied in an amount corresponding to that of the copper sulfide ore (e.g. chalcopyrite) for leaching thereof. Furthermore, for continuous leaching copper from the copper sulfide ore, iron(III) ions need to be continuously supplied as the oxidant. Further, iodine added to the leaching solution is also preferably recovered and subjected to recycling, in place of being disposed of. If iodine is circulated without being recovered prior to the iron oxidation step, there has been a problem in which the high loss of iodine occurs due to volatilization, or the oxidizing reaction rate of iron decreases.

In accordance with the present invention, it is not only possible to recover and re-use iodine from the first solution containing iodine after the copper leaching step, but also possible to produce iron(III) irons by passing the post-iodine recovery solution (or the second solution) through the stacked ore, for example, the heap or the dump. Further, although microorganisms, such as iron-oxidizing microorganisms which have been used so far may be supplied upon oxidation of iron, the iron oxidation occurs even without particularly adding the microorganisms.

In accordance with the present invention, it is necessary to separate iodine from the first solution obtained after the copper leaching process. As materials for the separation of iodine, materials having ability of adsorbing iodine by hydrophobic interaction are preferably employed. As to a degree at which the concentration of iodine is lowered, for example, in the conventional method typified by Patent Document 3, it is required to lower the concentration to 1 mg/L. On the other hand, in accordance with the present invention, it is sufficient to lower the concentration to about 10 mg/L. Further, iodine separated and obtained herein may be re-used.

Hereby, activated carbon having features of its large specific surface area and its high ability of removing iodine is particularly excellent, although solids having hydrophobic surface other than the activated carbon, for example, cokes or a hydrophobic resin, may also be employed.

The activated carbon having a large specific surface area, suitability for use in a liquid phase, and excellent stability is preferable. A shape of the activated carbon preferably is granular or spherical. For example, Coconut Shell Mc (made by Taihei Chemical Industrial Co. Ltd.) and SHIRASAGI X7000H (made by Japan Enviro Chemicals, Ltd.) may be employed. However, it should be appreciated that the present invention is not limited to activated carbon of any certain type or raw material or other features.

The above-mentioned activated carbon may be packed into a fixed bed, or it may be employed in the form of a fluidized bed. Iodine adsorbed on the activated carbon may be recovered and recycled by chemical treatment, heat treatment, combustion treatment and so on. Moreover, the used activated carbon may also be recycled by chemical treatment or heat treatment as well.

Upon recovering copper from the first solution, generally, a solvent extraction method employing an extractant that selectively extracts copper therefrom, and in rare instances, a cementation process may be employed. In accordance with the present invention, these methods may be conducted at any stage of a former step or a subsequent step in activated carbon treatment or microorganisms treatment.

One example of a process flow including a solvent extraction step in accordance with one exemplary embodiment of the present invention is illustrated in FIG. 1. It should be appreciated that, the process is not necessarily limited to a flow in series as illustrated in FIGS. 1 and 2. For example, the copper extraction step, along with the iodine recovery step and the iron oxidation step may be bypassed and arranged in parallel.

In practice, an optimized process flow may be applied in consideration of toxicity of iodine to the extractant and toxicity of the extractant to the microorganisms.

FIG. 1 illustrates a flowchart for separating and recovering copper by solvent extraction in accordance with one embodiment of the present invention.

Copper leaching is conducted in step S11, in which leaching treatment of copper sulfide ore is applied in the presence of iodine ions and iron ions (see Formulae 1 and 2), yielding a first solution. In step S12, treatment for lowering the concentration of iodine in the first solution from step S11, in which, for example, iodine is adsorbed onto the activated carbon to lower the concentration of iodine, yielding a second solution. In step S12, an example is described, in which the iodine separation step is an activated carbon treatment step in which iodine is adsorbed onto the activated carbon, but iodine may be separated by any method other than contacting the first solution to the activated carbon.

An iodide ions solution, for example, an aqueous solution of potassium iodide, sodium iodide and so on, if necessary, may be supplemented to the separated aqueous solution containing iodine separated and recovered from the iodine separation step in step S12. After supplementing the iodide ions solution, the resultant solution may be thereby provided as the aqueous solution containing iodine for the copper leaching step of step S11.

Subsequently, in step S13, copper is separated by solvent extraction from the second solution in which the concentration of iodine is lowered in step S12. The separated copper may be recovered in step S15 by applying a conventional technique such as electrowinning.

In step S14, a post-extraction solution (also called a raffinate) after copper is separated therefrom in step S13, is then passed through stacked ore, for example, the heap or the dump, to oxidize divalent iron ($Fe^{2+}$) therein, and thereby yielding a third solution. Divalent iron ions (iron(II) ions), for example, $FeSO_4$, may be supplemented, if necessary, to the post-treatment solution (or the third solution) to achieve the optimum concentration of iron(III) ions upon copper leaching, considering that the post-treatment solution in step S14 will be re-used in the copper leaching step of step S11.

As noted above, the post-treatment solution subjected to iron oxidation treatment in step S14 is provided in the form of an acidic solution containing iron(III) ions as the leaching solution for the copper leaching step of step S11.

FIG. 2 illustrates a flowchart for separating and recovering copper by solvent extraction in accordance with another embodiment of the present invention. In FIG. 2, an example is illustrated, in which treatment illustrated in FIG. 1 is applied in a small scale.

In step S21, copper leaching is conducted using a crude ore column (1 m× six columns directly connected). The crude ore column is formed, in which copper ore is crushed and packed, and six columns of 1 meter length are connected into a total column length of 6 meters, for example.

In step S22, in a manner similar to step S12 illustrated in FIG. 1, treatment for lowering the concentration of iodine in the first solution from step S21, for example, activated carbon treatment is applied. Also in FIG. 2, an activated carbon treatment step is specifically illustrated, but iodine may be separated by other than the method of contacting the first solution to the activated carbon.

An iodide ions solution, for example, an aqueous solution of potassium iodide, sodium iodide and so on, if necessary, may be supplemented to the separated aqueous solution containing iodine separated and recovered from the first solution in step S22, and provided as the aqueous solution containing iodine for the copper leaching step of step S21.

In step S23, cementation treatment is applied thereto, in which iron is added to the second solution in which the concentration of iodine is lowered in step S22 to precipitate copper therein. Copper is then recovered as cement copper herein.

In step S24, the second solution in cementation in step S23 is then passed through a copper leaching residue column to oxidize divalent ion ($Fe^{2+}$) therein, and thereby yielding a third solution. As the copper leaching residue column, a column, for example, a column of 1 meter length is used, and the copper leaching residue produced in step S21 is crushed, if necessary, and packed therein. As the copper leaching residue column, a column in which ore is crushed, if necessary, and packed may be employed.

Iron(III) ions, in the form of an acidic solution containing the same, for example, $Fe_2(SO_4)_3$, may be supplemented to the third solution obtained via oxidation treatment in step S24, and the resultant solution is provided as the leaching solution for the copper leaching step in step S21.

Furthermore, in FIGS. 1 and 2, as for timing for supplementing iron ions thereto, as in FIG. 1, divalent iron ions may be supplemented before iron oxidation treatment (step S14), and the supplemented iron ions also may be oxidized together with divalent iron ions contained in the post-extraction solution (raffinate) in step S13 in the iron oxidation treatment step. As in FIG. 2, trivalent iron ions may be supplemented to the post-iron oxidation treatment solution (or the third solution). Upon supplementing iron irons, supplementation of the iron ions as the divalent iron ions before the iron oxidation treatment step is preferable, considering that the divalent iron ions are available at lower price than the trivalent iron ions.

As ore to be stacked onto the heap or the dump to be used for regenerating iron(III) ions from iron(II) ions using the solution after removing iodine, it is desirable to employ ore that does not consume components needed for copper leaching, such as sulfuric acid and iron and so on in the solution. Specifically, ore containing primarily feldspar or the leaching residue of copper ore after copper leaching is preferable. However, it should be appreciated that the present invention is not limited to any type of ore.

For iron oxidation, ore of an 80% passing particle size of 1 centimeter or more is preferable in order to obtain a stable flow rate. However, it should be appreciated that the present invention is not limited to any particular particle size.

A rate of regenerating iron(III) ions in the heap or dump of stacked ore to be used for iron oxidation of the solution after activated carbon treatment is proportional to a surface area of the ore in a portion irrigated with the second solution of the heap or dump. The surface area of the ore in the heap or dump is generally proportional to the volume (solution irrigating surface area× height) of the solution irrigating portion, and inversely proportional to the particle size of the ore. An amount of iron(III) ions needed for leaching copper from ore during copper leaching is generally proportional to the surface area of the ore in the solution irrigating portion in the heap or dump of the stacked ore in the copper leaching step. Therefore, the present inventors have diligently studied on a ratio (a/b). Here, a value (a) is obtained by dividing a volume of the heap or dump of the stacked ore onto which the solution after activated carbon treatment is irrigated, by an 80% passing particle size of the ore. A value (b) is obtained by dividing a volume of the heap or dump of the stacked copper sulfide ore in the copper leaching step, by an 80% passing particle size of the copper sulfide ore in the copper leaching step. As a result, the present inventors have found that the ratio (a/b) is desirably 0.1 times or more (satisfying an expression: a/b≥0.1).

EXAMPLES

The further detailed description for the present invention is provided below by way of Examples. However, it should be appreciated that the present invention is not limited to the following specific examples.

Example 1

As copper ore used in a test, crude ore primarily containing primary copper sulfide ore (chalcopyrite) mined in Chile was used. A total copper grade was 0.43%. A copper ore composition was calculated according to Sequential Assay, and it contained 5% of copper oxide ore, 45% of secondary copper sulfide ore, and 50% of primary copper sulfide ore. Primary copper of the primary copper sulfide ore was confirmed as chalcopyrite ($CuFeS_2$) by means of MLA: Mineral Liberation Analyzer.

The Sequential Assay is a method in which the copper ore in the ore is eluted by the following procedures to calculate the copper oxide ore, the secondary copper sulfide ore, and the primary copper sulfide ore based on the analysis results, and the analysis was requested to the analysis institution SGS Lakefield Research Chile S.A.

(1) Copper oxide ore: sulfuric acid was added to a sample pulverized to a predetermined particle size, and the mixture was stirred for a predetermined time. Eluted copper was then quantitatively determined.

(2) Secondary copper sulfide ore: a sodium cyanide solution was added to a solid portion obtained by solid-liquid separation in analysis of copper oxide ore, and the mixture was stirred for a predetermined time. Eluted copper was then quantitatively determined.

(3) Primary copper sulfide ore: nitric acid and perchloric acid were added to a solid portion obtained by solid-liquid separation in analysis of secondary copper sulfide ore, and the mixture was dried and solidified on a hotplate, and then hydrochloric acid and distilled water were added thereto to dissolve the solid. Eluted copper was then quantitatively determined.

The above-mentioned ore was crushed to achieve an 80% passing particle size of ½ inch (1.27 centimeters) or less, and then 12 kg (72 kg in total) was packed into each of six transparent cylinders made of polyvinyl chloride (hereafter referred to as columns) with a diameter of 10 centimeters and a height of 1 meter. The six columns were directly connected into a height of 6 meters in total. Cleaning by dilute sulfuric acid and leaching by a sulfuric acid solution containing iron(III) ions at 5 g/L were conducted. Then, in and after the $56^{th}$ day, a sulfuric acid pre-leaching solution A prepared to be 6.7 g/L in an iron(III) ions concentration and a pre-leaching solution B prepared to be 400 mg/L in an iodide ions concentration were separately irrigated thereonto at a rate of 1.5 L/day and 0.5 L/day, respectively, from a top of the first column. Filter cloth and a perforated plate made of polyvinyl chloride were arranged on a bottom of the cylinder made of polyvinyl chloride, and a solution passed through it was subsequently irrigated onto a top of the successive column. A leaching solution after passing through six columns was taken as a first solution in the copper leaching step.

The first solution in the copper leaching step was passed through the column prepared by packing activated carbon into a column with a height of 30 centimeters, a diameter of 4 centimeters to adsorb iodine in the first solution onto the activated carbon and separate iodine therefrom to obtain a post-activated carbon treatment solution (or the second solution) (iodine recovery step). Iodine adsorbed on the activated carbon and separated from the solution was desorbed using a sulfurous acid solution, and re-used as iodide ions.

A copper component in the post-activated carbon treatment solution was recovered by cementation treatment. Specifically, iron nails were added to the post-activated carbon treatment solution to precipitate and remove copper therein (copper recovery step).

The post-copper recovery step solution was then passed through a column packed with 12 kilograms of residue after ordinary copper leaching treatment was applied to the copper ore mined in Chile (an 80% passing particle size: ½ inch or less) (the iron oxidation step) to obtain a post-iron-oxidation solution (or the third solution). Incidentally, no microorganisms are intendedly added to the residue.

Ferric sulfate was appropriately added to the post-iron-oxidation solution to be 6.7 g/L in the concentration of iron, and taken as the pre-leaching solution A. Potassium iodide was appropriately added to an iodine recovery solution desorbed from the activated carbon to be 520 mg/L in the concentration of iodine, and taken as pre-leaching solution B. A test flow is illustrated in FIG. 2.

FIG. 3 illustrates change of a leaching rate of copper, which is calculated from the concentration of copper in the first solution. As Comparative Example, change of the leaching rate of copper at the concentration of iron equivalent thereto when no iodine was added thereto. FIG. 4 illustrates change of a concentration of $Fe^{3+}$ before and after the residue column. In the present Example, iron nails are employed for cementation in the copper recovery process. Thus, iron was eluted from the iron nails during recovery of copper, and many of the iron(III) ions contained in the solution were converted into iron(II) ions into a form in which iron(II) ions can be substantially supplemented before the iron oxidation step. As illustrated in FIGS. 3 and 4, iron(II) ions were smoothly oxidized into iron(III) ions by passing the solution through the column using the residue, and copper was efficiently leached from the copper sulfide ore. Furthermore, even though the concentration of iodine in the solution before the residue column increased to 4 mg/L, iron(II) ions were able to be oxidized into iron(III) ions without any particular problems.

Incidentally, in the present Example, a ratio (a/b) was 0.167 times. Here, a value (a) is obtained by dividing a volume of the column using the residue through which the post-activated carbon treatment solution was passed, by an 80% passing particle size of the ore. A value (b) is obtained by dividing a volume of the column in the copper leaching step by an 80% passing particle size of the ore used in the copper leaching step. The ratio (a/b) is the same with the column volume ratio, because the 80% passing particle size of ores in the two columns is the same.

Example 2

Crude ore primarily containing primary copper sulfide ore (chalcopyrite) mined in Chile was used as copper sulfide ore in a test. A total copper grade was 0.37%. A copper ore composition was calculated according to Sequential Assay, and the ore contained 3% of copper oxide ore, 8% of secondary copper sulfide ore, and 89% of primary copper sulfide ore. A copper mineral of the primary copper sulfide ore was confirmed as chalcopyrite ($CuFeS_2$) by MLA: Mineral Liberation Analyzer. The copper ore was crushed to achieve an 80% passing particle size of 0.5 inch or less in the particle size.

About 3000 t of the above-mentioned copper ore was then used to build a copper ore heap with a height of 6 meters, and a top area of 100 $m^2$. Drippers were arranged in a way that an iron(III) ions solution and an iodide ions solution evenly and separately are irrigated from the top area of the heap at an interval of 50 centimeters, respectively. The heap was cleaned with dilute sulfuric acid, and then the iron(III) ions solution at 5.0 g/L was irrigated onto the heap up to a liquid volume of 1.5 $m^3$/t. Then, a concentration of iron(III) ions was adjusted to be 5.6 g/L at a rate of 21.6 $m^3$/day and the iodide ions were adjusted to be 1 g/L at a rate of 2.4 m³/day, and each was dripped onto the heap from the drippers.

The iodide ions solution and the iron(III) ions solution irrigated thereonto were mixed upon passing through the lower copper ore (about 900 t), while copper was leached from the copper ore, and was recovered as the post-leaching solution (or the first solution) containing copper from a bottom of the heap. The post-leaching solution collected from the bottom of the heap was then allowed to pass through a packed tower packed with about 400 kg of activated carbon to recover the iodine contained in the first solution and simultaneously to yield a second solution. The iodine adsorbed on the activated carbon and recovered therefrom was desorbed by a sulfurous acid solution at each predetermined time interval to re-use the resultant solution as the pre-leaching solution containing iodide ions (namely, the above-mentioned iodide ion solution). Potassium iodide was additionally supplemented when iodide ions in the pre-leaching solution (iodide ions solution) were insufficient.

Copper contained in the leaching solution (or the second solution) was recovered by a solvent extraction apparatus using a commercially available copper extractant. The copper extracted in the solvent was back-extracted by using sulfuric acid, and collected as a copper cathode by electrowinning.

The post-extraction solution (or raffinate) after solvent extraction was evenly irrigated through drippers arranged at an interval of 50 centimeters, onto the heap of stacked feldspar crushed to an 80% passing particle size of 0.5 inch or less. The heap had a top area of 93 m², and a height of 3 m (an amount of ore under solution irrigation was 450 t). The post-leaching solution (or the third solution) was collected from the bottom of the heap, and a ferric sulfate solution was added in order to supply insufficient iron(III) ions, and taken as the pre-leaching solution (iron(III) ions solution).

The results of chemical analysis of the feldspar used herein are provided in the following TABLE 1. Further, according to the results of analysis by XRD, the primary components of the feldspar were Albite: $NaAlSi_3O_8$ and Quartz: $SiO_2$.

the first solution) was passed through an activated carbon packed tower to separate iodine therein. In step S33, the post-elution solution (or the second solution) eluted from the activated carbon packed tower was subjected to solvent extraction by a publicly known extractant and a publicly known method to separate copper therein. The copper extracted was subjected to electrowinning, and collected and recovered.

As described in step S34, the post-extraction solution (raffinate) from step S33 was irrigated onto an iron-oxidizing heap (feldspar) to oxidize iron in the post-extraction solution (raffinate). To the iron(III) ions solution obtained by iron oxidation, if necessary, ferric sulfate as a source of trivalent iron may be supplemented, and the resultant mixture can be used as the leaching solution for leaching copper in the copper ore heap in step S31.

As described in step S32, when the adsorbed iodine reaches a certain degree, a sulfurous acid solution is passed therethrough to recover iodine. To the recovered iodide ions solution, if necessary, potassium iodide is supplemented and the resultant solution can be irrigated onto the copper ore heap in step S31.

FIG. 6 illustrates change of a proportion of iron(III) ions in total iron in the pre-leaching solution and the post-leaching solution and the post-iron-oxidizing heap solution, and a concentration of copper in the pre-leaching solution and the post-leaching solution in a predetermined time in Example 2.

As illustrated in FIG. 6, the proportion of iron(III) ions in the total iron in the pre-leaching solution remained nearly 100%. On the other hand, the proportion of iron(III) ions in the total iron in the post-leaching solution decreased to about 80% due to the reaction between the iodide ions and the copper ore in the heap of copper ore. However, after the solution was subjected to the activated carbon packed tower and the solvent extraction to recover iodine and copper therein, and then passed through the iron-oxidizing heap, the proportion of iron(III) ions in the total iron in the post-iron-oxidizing heap solution increased to about 100%, indicating that the solution was able to be re-used as the pre-leaching solution. Further, the concentration of copper in the post-copper ore heap solution exceeded the concentration in the

TABLE 1

| Component | Cu | Fe | S | S-O | Mn | Zn | As | Mo | Ag |
|---|---|---|---|---|---|---|---|---|---|
| Unit | % | % | % | % | % | % | ppm | % | ppm |
|  | 0.01 | 5.1 | 0.24 | <0.01 | 0.11 | 0.02 | <100 | 0.03 | <100 |
| Component | I | $NO_3$ | K | Na | Mg | Ca | Al | Si |  |
| Unit | ppm | % | % | % | % | % | % | % |  |
|  | <50 | <0.01 | 2.5 | 2.7 | 1.6 | 3.4 | 8.7 | 24 |  |

A ratio (a/b) of this example was 0.465 times. Here, a value (a) is obtained by dividing a volume of the iron-oxidation heap by an 80% passing particle size of the feldspar therein, and a value (b) is obtained by dividing a volume of the heap in the copper leaching step by an 80% passing particle size of the ore in the same step. The ratio (a/b) is the same as the heap volume ratio, because the 80% passing particle size of ores in both heaps is equal.

A test flow is illustrated in FIG. 5.

As described in step S31 in FIG. 5, an iron(III) ions solution and an iodide ions solution were irrigated onto the heap of copper ore to leach the copper therein. Subsequently, in step S32, the post-copper leaching solution of step S31 (or pre-leaching solution. In view of these facts, the present invention has been demonstrated to be effective in keeping an effect of promoting leaching of copper with the iodide ions and the iron(III) ions.

Comparative Example

A test was conducted under the same conditions as Example 2 except that an 80% passing particle size of feldspar in an iron-oxidizing heap was adjusted to 2 inches, and a top surface area for solution irrigating was adjusted to 93 m², and a height was adjusted to 2 meters. According to Comparative Example, a ratio (a/b) became 0.0775 times from a column volume ratio (0.31) and an 80% passing particle size ratio (4). Here, a value (a) is obtained by dividing a volume of the iron-oxidizing heap by an 80% passing particle size of the feldspar therein, and a value (b) is obtained by dividing a volume of the heap in a copper leaching step by an 80% passing particle size of ore in the same step. In this instance, a proportion of a concentration of iron(III) ions to a concentration of total iron ions in a post-iron-oxidizing heap solution (or the third solution) was no more than about 80% (as illustrated in FIG. 7), indicating that the solution was insufficient for use as a pre-leaching solution for a heap of copper sulfide ore.

Reference Example

A relationship between a concentration of iodine ions and a percentage of iron oxidation in an iron oxidation treatment step was investigated as described below.

A solution prepared by adding potassium iodide at an optional concentration (between 0 and 83 mg/L) to a solution containing divalent iron ions ($Fe^{2+}$) at 5 g/L was irrigated onto the crude ore column used in Example 1, at a rate of 1 L/day. A concentration of total iron (Fe) and $Fe^{2+}$ in a solution collected at an outlet of the column was analyzed.

The results of analysis are illustrated in FIG. 8.

Referring to FIG. 8, when the concentration of potassium iodide increases, for example, exceeds about 47 mg/L, the percentage of iron oxidation falls, resulted in suggesting that iron oxidation does not advantageously proceed in the iron oxidation treatment step. In view of this fact, the concentration of iodine ions in the second solution provided for the iron oxidation treatment step was found to be preferably lowered to, for example, 10 mg/L.

The invention claimed is:

1. A method for leaching copper from copper sulfide ore, comprising the following steps:
   a copper leaching step for leaching copper from a copper sulfide ore using a sulfuric acid solution containing iodide ions and iron(III) ions as a leaching solution to yield a first solution;
   an iodine separation treating step for separating iodine in the first solution to yield a second solution having a lowered concentration of iodine therein;
   an iron oxidation step for oxidizing the second solution to yield a third solution; and
   leaching the copper sulfide ore or another copper sulfide ore using the third solution and an aqueous solution containing iodine,
   wherein the iron oxidation step comprises irrigating the second solution onto a stacked ore, thereby oxidizing ion(II) ions generated via the copper leaching step.

2. The method for leaching copper from copper sulfide ore according to claim 1, further comprising newly adding ion(II) ions to the second solution before the iron oxidation step.

3. The method for leaching copper from copper sulfide ore according to claim 1, wherein the stacked ore onto which the second solution is irrigated is formed by stacking leaching residue of a copper ore.

4. The method for leaching copper from copper sulfide ore according to claim 1, wherein the primary component of the stacked ore onto which the second solution is irrigated is silicate ore.

5. The method for leaching copper from copper sulfide ore according to claim 1, wherein an 80% passing particle size of ore used for the stacked ore onto which the second solution is irrigated is 1 centimeter or more.

6. The method for leaching copper from copper sulfide ore according to claim 1, wherein no microorganisms are added preliminarily or during the iron oxidation step, to the stacked ore onto which the second solution is irrigated.

7. The method for leaching copper from copper sulfide ore according to claim 1, wherein a ratio (a) of a volume of the stacked ore to the 80% passing particle size of the stacked ore onto which the second solution is irrigated and a ratio (b) of a volume of the copper sulfide ore used in the copper leaching step to a 80% passing particle size of the copper sulfide ore used in the copper leaching step satisfy an expression: $a/b \geq 0.1$.

8. The method for leaching copper from copper sulfide ore according to claim 2, wherein the stacked ore onto which the second solution is irrigated is formed by stacking leaching residue of a copper ore.

9. The method for leaching copper from copper sulfide ore according to claim 2, wherein the primary component of the stacked ore onto which the second solution is irrigated is silicate ore.

10. The method for leaching copper from copper sulfide ore according to claim 2, wherein an 80% passing particle size of ore used for the stacked ore onto which the second solution is irrigated is 1 centimeter or more.

11. The method for leaching copper from copper sulfide ore according to claim 3, wherein an 80% passing particle size of ore used for the stacked ore onto which the second solution is irrigated is 1 centimeter or more.

12. The method for leaching copper from copper sulfide ore according to claim 4, wherein an 80% passing particle size of ore used for the stacked ore onto which the second solution is irrigated is 1 centimeter or more.

13. The method for leaching copper from copper sulfide ore according to claim 2, wherein no microorganisms are added preliminarily or during the iron oxidation step, to the stacked ore onto which the second solution is irrigated.

14. The method for leaching copper from copper sulfide ore according to claim 3, wherein no microorganisms are added preliminarily or during the iron oxidation step, to the stacked ore onto which the second solution is irrigated.

15. The method for leaching copper from copper sulfide ore according to claim 4, wherein no microorganisms are added preliminarily or during the iron oxidation step, to the stacked ore onto which the second solution is irrigated.

16. The method for leaching copper from copper sulfide ore according to claim 5, wherein no microorganisms are added preliminarily or during the iron oxidation step, to the stacked ore onto which the second solution is irrigated.

17. The method for leaching copper from copper sulfide ore according to claim 2, wherein a ratio (a) of a volume of the stacked ore to the 80% passing particle size of the stacked ore onto which the second solution is irrigated and a ratio (b) of a volume of the copper sulfide ore used in the copper leaching step to a 80% passing particle size of the copper sulfide ore used in the copper leaching step satisfy an expression: $a/b \geq 0.1$.

18. The method for leaching copper from copper sulfide ore according to claim 3, wherein a ratio (a) of a volume of the stacked ore to the 80% passing particle size of the stacked ore onto which the second solution is irrigated and a ratio (b) of a volume of the copper sulfide ore used in the copper leaching step to a 80% passing particle size of the copper sulfide ore used in the copper leaching step satisfy an expression: $a/b \geq 0.1$.

19. The method for leaching copper from copper sulfide ore according to claim 4, wherein a ratio (a) of a volume of the stacked ore to the 80% passing particle size of the stacked ore onto which the second solution is irrigated and a ratio (b) of a volume of the copper sulfide ore used in the copper leaching step to a 80% passing particle size of the copper sulfide ore used in the copper leaching step satisfy an expression: $a/b \geq 0.1$.

20. The method for leaching copper from copper sulfide ore according to claim 5, wherein a ratio (a) of a volume of the stacked ore to the 80% passing particle size of the stacked ore onto which the second solution is irrigated and a ratio (b) of a volume of the copper sulfide ore used in the copper leaching step to a 80% passing particle size of the copper sulfide ore used in the copper leaching step satisfy an expression: $a/b \geq 0.1$.

* * * * *